(12) United States Patent
Goli et al.

(10) Patent No.: US 12,045,562 B1
(45) Date of Patent: Jul. 23, 2024

(54) DYNAMICALLY GENERATING SHARED SPREADSHEETS ACCORDING TO USER REFERENCES IN SPREADSHEET DATA

(71) Applicant: Amazon Technologies, Inc., Seattle, WA (US)

(72) Inventors: Rajesh Goli, Fremont, CA (US); Vivek Madani, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 17/710,777

(22) Filed: Mar. 31, 2022

(51) Int. Cl.
  *G06F 3/048* (2013.01)
  *G06F 3/0482* (2013.01)
  *G06F 16/2452* (2019.01)
  *G06F 40/18* (2020.01)

(52) U.S. Cl.
  CPC ............ *G06F 40/18* (2020.01); *G06F 3/0482* (2013.01); *G06F 16/24522* (2019.01)

(58) Field of Classification Search
  CPC ... G06F 40/18; G06F 3/0482; G06F 16/24522
  See application file for complete search history.

(56) References Cited

U.S. PATENT DOCUMENTS

| | | | |
|---|---|---|---|
| 7,401,094 B1 | 7/2008 | Kesler | |
| 8,880,436 B2 | 11/2014 | Chan | |
| 10,216,494 B2 | 2/2019 | Stachura | |
| 11,113,041 B2 | 9/2021 | Stachura | |
| 2017/0139891 A1* | 5/2017 | Ah-Soon | G06F 40/18 |
| 2020/0150938 A1 | 5/2020 | Stachura | |
| 2023/0094042 A1* | 3/2023 | Lavery | G06N 5/02 |
| | | | 715/212 |

* cited by examiner

*Primary Examiner* — Claudia Dragoescu
(74) *Attorney, Agent, or Firm* — S. Scott Foster; Kowert, Hood, Munyon, Rankin & Goetzel, P.C.

(57) ABSTRACT

Editing and sharing spreadsheets of a spreadsheet editor system are disclosed. Interactions pertaining to requests of users of the spreadsheet editor system may be treated via natural language queries that are received at an interface of said system. When a first user attempts to share a spreadsheet with a second user, various spreadsheet filtering techniques may cause a new version of the given spreadsheet to be generated for the second user depending on permissions and metadata of one or both users of the editable spreadsheet system. References of the second user may additionally be used to modify a spreadsheet for viewing by the second user.

20 Claims, 17 Drawing Sheets

FIG. 6B interface 600

602 — Spreadsheets
- Booth Staffing
- Breakout Agenda
- Speakers

Booth Staffing — 604

650 — User A

Show Booth Staffing by start time. — 630

| Row — 610 | Name — 612 | Supervisor — 614 | Start Time — 616 618 ▲ | End Time |
|---|---|---|---|---|
| 1 | User C | User A | 9:00am | 12:00pm |
| 2 | User D | User B | 9:00am | 12:00pm |
| 3 | User E | User A | 9:00am | 12:00pm |
| 4 | User F | User A | 9:00am | 12:00pm |
| 5 | User G | User B | 12:00pm | 4:00pm |
| New row? | | 632 | | + |

FIG. 6C interface 600

Spreadsheets <
- Booth Staffing
- Breakout Agenda
- Speakers

650 — User A

Booth Staffing ⟵ 604

[Share Booth Staffing with User B.] ⟵ 630

| Row ⟵ 610 | Name ⟵ 612 | 614 ⟵ Supervisor | 616 ⟵ Start Time | 618 ⟵ End Time |
|---|---|---|---|---|
| 1 | User C | User A | 9:00am | 12:00pm |
| 2 | User D | User B | 9:00am | 12:00pm |
| 3 | User E | User A | 9:00am | 12:00pm |
| 4 | User F | User A | 9:00am | 12:00pm |
| 5 | User G | User B | 12:00pm | 4:00pm |
| New row? | | 632 | | + | interface 600

Spreadsheets ‹
Booth Staffing

670

Booth Staffing 672

652 User B

Ask your data anything. 674

| Row 680 | Name ▲ | 682 Supervisor 684 | 686 Start Time | 688 End Time |
|---|---|---|---|---|
| 1 | User D | User B | 9:00am | 12:00pm |
| 2 | User G | User B | 9:00am | 12:00pm |

DYNAMICALLY GENERATING SHARED SPREADSHEETS ACCORDING TO USER REFERENCES IN SPREADSHEET DATA

BACKGROUND

As the technological capacity for organizations to create, track, and retain information continues to grow, a variety of different technologies for managing and storing data in a collaborative way have developed. Demand for customizable features of spreadsheets and tables that allow for quick and easy sharing of data has increased. For example, tabular-formatted spreadsheets and tables are an effective way for employees to organize, view, manipulate, and share data that is relevant to their titles and/or positions within a company.

BRIEF DESCRIPTION OF THE DRAWINGS

FIG. 6B is an example interface of a spreadsheet editor for User A illustrating a given spreadsheet and a natural language request from User A for organizing data of the spreadsheet, according to some embodiments.

FIG. 6C is an example interface of a spreadsheet editor for User A illustrating a given spreadsheet and a natural language request from User A for sharing data of the spreadsheet with User B, according to some embodiments.

FIG. 6E is an example interface of a spreadsheet editor for User B illustrating a given spreadsheet that has been shared with them by request of User A, according to some embodiments.

FIG. 7D is an example interface of a spreadsheet editor for User A illustrating an editable spreadsheet function of adding data to a new row of a given spreadsheet, in which the "Start Time" and "End Time" columns may be completed by User A, according to some embodiments.

Figure 1:
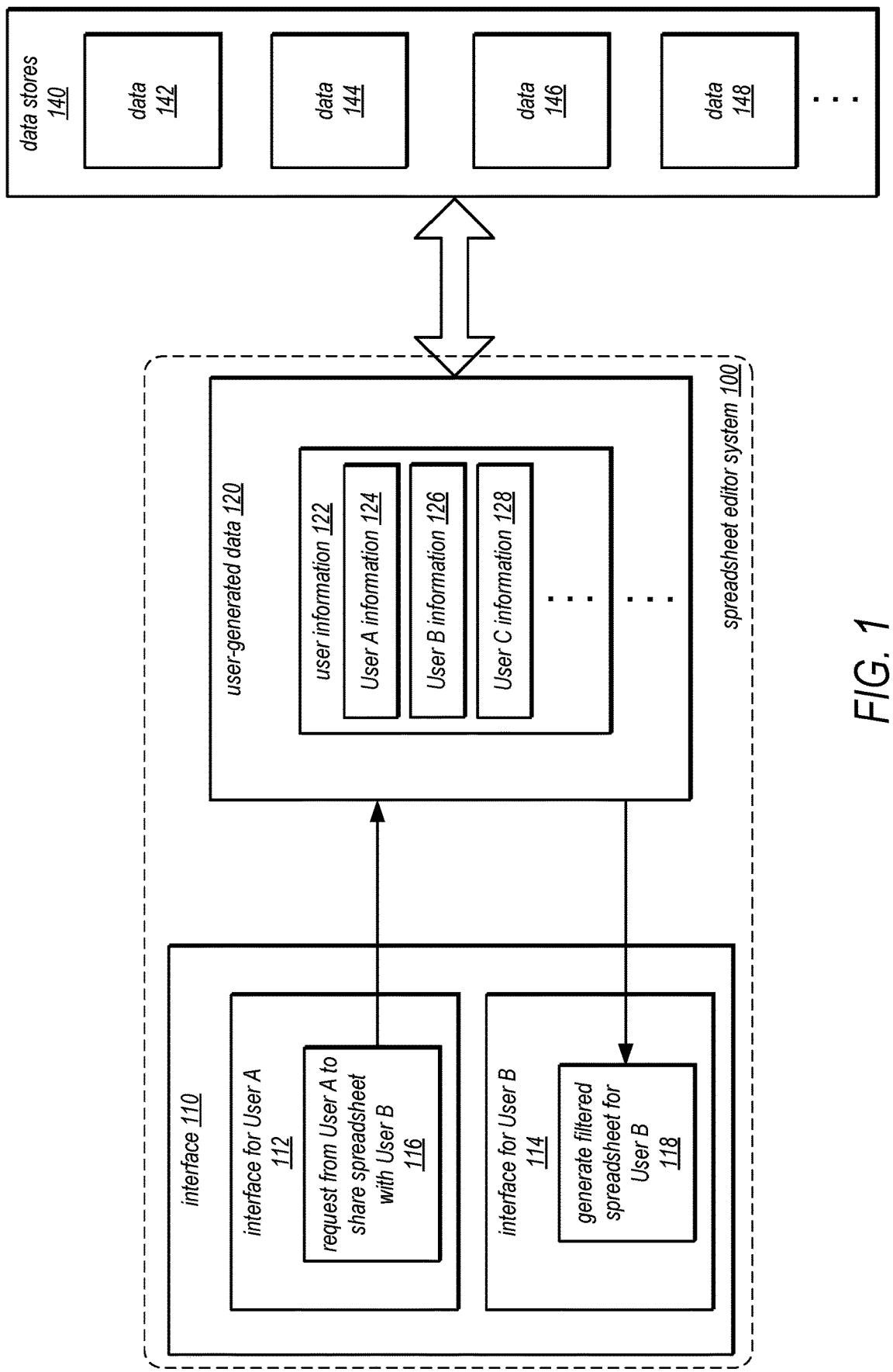
FIG. 1 is a logical block diagram illustrating the process of sharing a spreadsheet of a spreadsheet editor with another user, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of dynamically generating shared spreadsheets according to user references in spreadsheet data are disclosed. Spreadsheets may comprise data of multiple datatypes organized in a tabular format with rows and columns. In some embodiments disclosed herein, it may be advantageous for a user to formulate a natural language query to generate a spreadsheet, which can be used to search various data sources to obtain data and populate the spreadsheet in satisfaction of the natural language query. Then, the generated spreadsheet can be shared with other users of the spreadsheet editor. In this way, spreadsheets can be quickly generated from one or multiple data sources without relying upon specific data store knowledge or expertise (e.g., experience with creating Structured Query Language (SQL) queries to obtain and combine data from across multiple database systems). Moreover, once a useful spreadsheet has been generated (e.g., which could occur after trying various different natural language queries), the spreadsheet can be shared with other users and dynamically customized for the users of the shared spreadsheet.

For example, in various embodiments, techniques for dynamically generating shared spreadsheets according to user references in spreadsheet data may provide an efficient way for an employee to redact particularly sensitive information or include only pertinent information prior to sharing a given spreadsheet to another employee without requiring the employee to manually delete or identify certain rows or columns. Instead, user references, user-generated data, and other metadata, as discussed in detail below, may be used to dynamically generate a version of the spreadsheet that does not provide the sensitive information (or includes the pertinent information). Additionally, users may create and edit tables for planning events, tracking metrics, or managing other data that require either involvement, organization, or input from other users. Techniques for dynamically generating shared spreadsheets according to user references in spreadsheet data may provide a secure way to guarantee that the distribution of and updates to data is securely coordinated between different users. For instance, a dynamically generated version of a spreadsheet may only include information that is editable by the user associated with that version of the spreadsheet. In this way, edits to other user's data may be blocked as they are not visible or editable by that user. Moreover, the techniques for dynamically generating shared spreadsheets according to user references in spreadsheet data may provide a scalable way to produce custom spreadsheets in scenarios for a large number of shared users without increasing the creation or maintenance costs of enforcing access controls on the data.

This specification begins with a general description of a spreadsheet editor system that supports natural language querying and dynamic spreadsheet generation. Then various examples of spreadsheet editor implementations including different components, or arrangements of components that may be employed as part of implementing the spreadsheet editor system, such as may be used to implement a spreadsheet editor service in a provider network, are discussed. A number of different methods and techniques to implement dynamically generating shared spreadsheets according to user references in spreadsheet data are then discussed, some of which are illustrated in accompanying flowcharts. Finally, a description of an example computing system upon which the various components, modules, systems, devices, and/or nodes may be implemented is provided. Various examples are provided throughout the specification.

FIG. 1 is a logical block diagram illustrating the process of sharing a spreadsheet of a spreadsheet editor with another user, according to some embodiments.

In FIG. 1, spreadsheet editor system 100 may comprise an interface, such as interface 110, to display one or more editable spreadsheets to users of spreadsheet editor system 100. Interface 110 may comprise at least interface for User A 112 and interface for User B 114, wherein Users A and B are users of spreadsheet editor system 100. In some embodiments, interface for User A 112 and interface for User B 114 may resemble User A profile 650, User B profile 652, and User A profile 750 (see descriptions for FIGS. 6A-7D herein).

Spreadsheet editor system 100 may also comprise user-generated data, such as user-generated data 120, associated to users of spreadsheet editor system 100. In some embodiments, user-generated data 120 may comprise user-specific data within user information 122, such as User A information 124, User B information 126, and User C information 128. In some embodiments, user-generated data 120 may comprise other types of data and/or metadata that are relevant to the spreadsheet editor system 100, such as sharing rules 330, filtering rules 332, or viewing rules 334 (see the description of FIG. 3 herein).

In some embodiments, interface 110 may be used to make, write, and send requests associated to spreadsheets of spreadsheet editor system 100 via natural language queries. Interface 110 is configured to receive one or more criteria pertaining to generating and/or sharing spreadsheets, according to some embodiments. In some embodiments, request from User A to share spreadsheet with User B 116 may comprise a natural language request. A natural language query of spreadsheet editor system 100 may not conform to any specify query language or other structured language, protocol, or parameters for interfacing with specific data storage systems for data stores 140 and/or spreadsheet editor system 100, but instead may exhibit natural human language features including various verbs, nouns, clauses, phrases, or other human syntax for expressing a query for a result generated or returned from data stores 140, in various embodiments. As a result, natural language queries may include multiple formulations of input words that may query for the same result.

In some embodiments, request from User A to share spreadsheet with User B 116 may pass through user-generated data 120 before a data pull via data stores 140 is made. For example, spreadsheet editor system 100 may verify, via User A information 124, that User A has an appropriate level of permission to share the spreadsheet with User B. Data in data stores 140, such as data 142, data 144, data 146, and data 148, may comprise data associated with spreadsheets of spreadsheet editor system 100 that may be requested via interface 110, such as request from User A to share spreadsheet with User B 116.

In some embodiments, user-generated data 120 may also be used to verify, via User B information 126, that User B has an appropriate level of permissions to view the spreadsheet. In some embodiments of this example, portions of the spreadsheet as viewed by User A may be removed or deleted before generate spreadsheet for User B 118 is complete if it is found via user-generated data 120 that User B does not have the same level of permissions for viewing the spreadsheet as viewed by User A. This may be referred to as a version of the spreadsheet, or User B's version of the spreadsheet. The processes described in FIG. 1 may also resemble Request 430 (see description for FIG. 4 herein), according to some embodiments.

Figure 2:
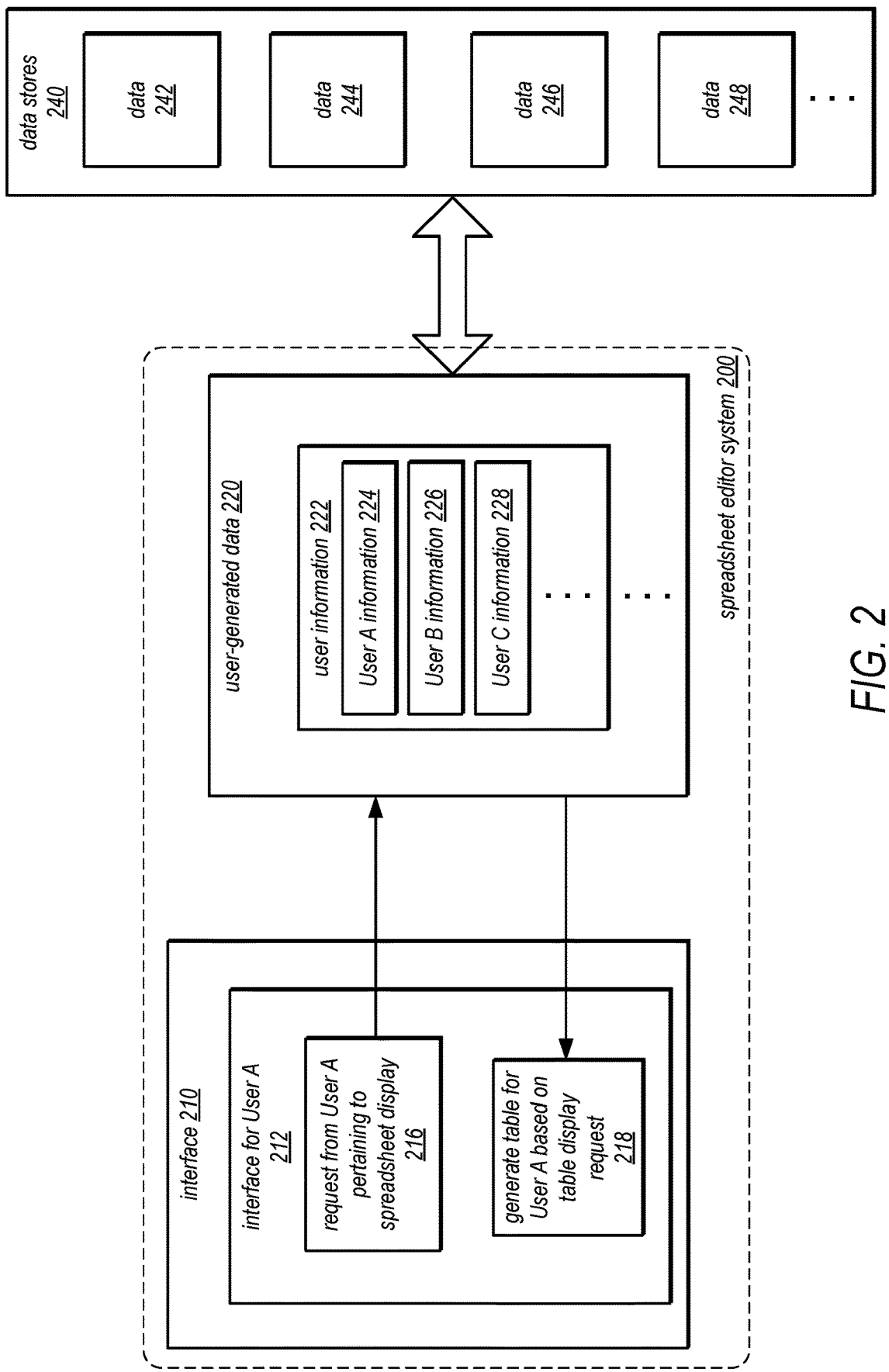
FIG. 2 is a logical block diagram illustrating a request from a user of a spreadsheet editor to view a spreadsheet, according to some embodiments.

FIG. 2 is a logical block diagram illustrating a request from a user of a spreadsheet editor to view a spreadsheet, according to some embodiments.

In FIG. 2, spreadsheet editor system 200 may comprise an interface, such as interface 210, to display one or more editable spreadsheets to users of spreadsheet editor system 200. Interface 210 may comprise at least interface for User A 212, wherein User A is a user of spreadsheet editor system 200. In some embodiments, interface for User A 212 may resemble User A profile 650 and User A profile 750 (see descriptions for FIGS. 6A-7D herein).

Spreadsheet editor system 200 may also comprise user-generated data, such as user-generated data 220, associated to users of spreadsheet editor system 200. In some embodiments, user-generated data 220 may comprise user-specific data and/or metadata within user information 222, such as User A information 224, User B information 226, and User C information 228. In some embodiments, user-generated data 220 may comprise other types of data and/or metadata that are relevant to the spreadsheet editor system 200, such as sharing rules 330, filtering rules 332, or viewing rules 334 (see the description of FIG. 3 herein).

The processes described in FIG. 2 may also resemble Editable spreadsheet function 450 (see description for FIG. 4 herein), according to some embodiments. User A may send a natural language request (see description of FIG. 1 herein) via interface for User A, such as request from User A pertaining to spreadsheet display 216. Example embodiments of such a request may comprise a request for re-organizing data in a given spreadsheet, or updating (adding, deleting, copying, moving) data in the given spreadsheet. Spreadsheet editor system 200 may then verify, via User A information 224, that User A has permission to re-organize and/or update data in the given spreadsheet. In some embodiments, user-generated data 220 may be used to verify that User A is the spreadsheet manager of the given spreadsheet and therefore has permission to perform one or more of said editable spreadsheet functions on the given spreadsheet. Data in data stores 240, such as data 242, data 244, data 246, and data 248, may comprise data associated with the given spreadsheet and therefore may be used to complete the request. Finally, User A may be provided with the updated table at interface for User A 212 via generate table for User A based on table display request 218.

Figure 3:
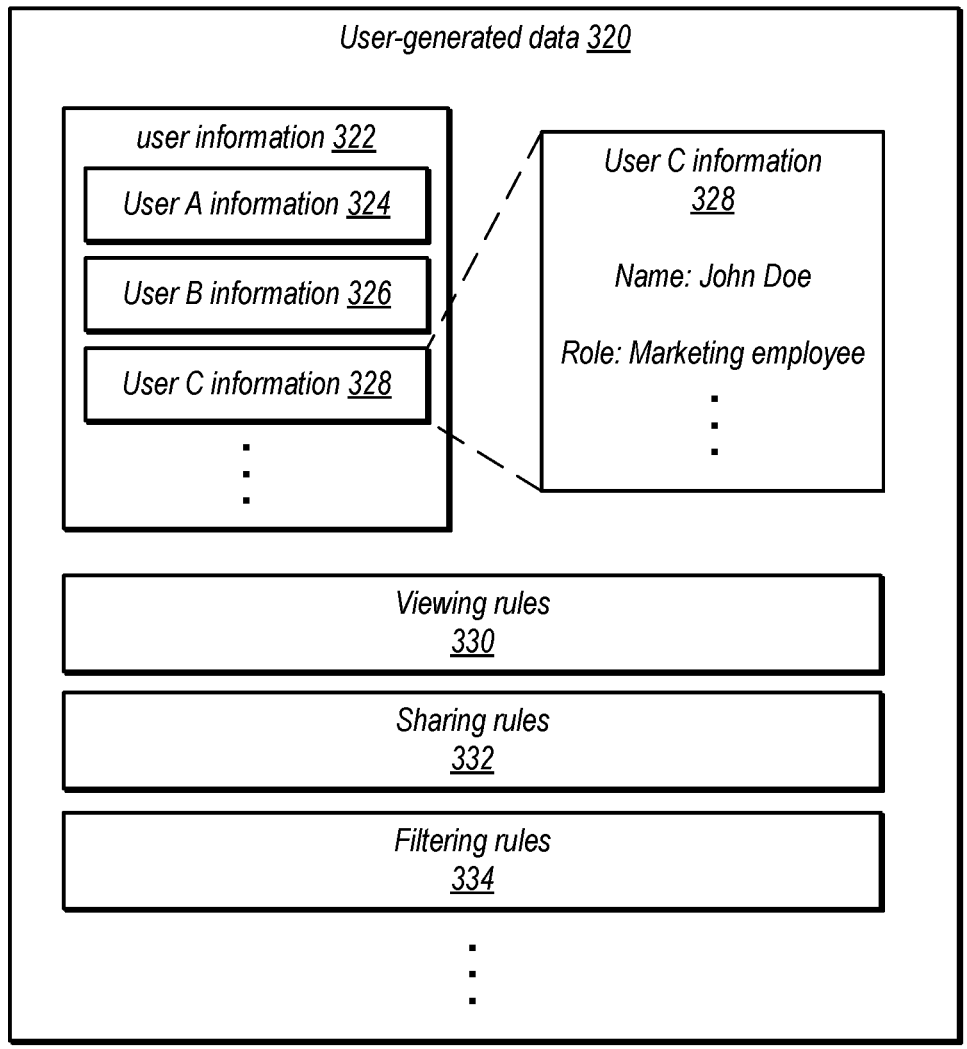
FIG. 3 is a logical block diagram illustrating types of user-generated data that may be used to generate user-specific versions of spreadsheets, according to some embodiments.

FIG. 3 is a logical block diagram illustrating types of user-generated data that may be used to generate user-specific versions of spreadsheets, according to some embodiments.

FIG. 3 demonstrates types of elements that may be stored in user-generated data 320. In some embodiments, user-generated data 320 may comprise similar elements as user-generated data 120 and user-generated data 220, and may be incorporated into the processes shown in FIG. 1 and FIG. 2. Various synonyms, alias, descriptions, possible cell values, or other metadata that describes the content of given spreadsheets may be included in user-generated data 320. In addition, user information 322 comprises data specific to users of the spreadsheet editor, such as User A information 324, User B information 326, and User C information 328. It should be understood by the reader that user information 322 may comprise user information for each user of the spreadsheet editor, or only certain relevant users, according to some embodiments. Such data may comprise information that is relevant to the spreadsheet editor, such as a given user's name and role within the company, such as "Name: John Doe" and "Role: Marketing employee" shown in User C information 328. In some embodiments, user information 322 may comprise additional company-specific information, such as email addresses of the employees, a list of spreadsheet users with a security clearance, or a list of spreadsheet users that are allowed to view sensitive information, such as an accounting department who is allowed to view a column of social security numbers. User information 322 may additionally comprise company structure, company hierarchy, employee roles and/or titles (e.g. Sales, Marketing, Finance, Project Management, etc.), or other data specific to a given user set of the spreadsheet editor.

User information 322 may be used as input(s) to sharing rules 330, filtering rules 332, and viewing rules 334. For example, in embodiments in which only the accounting department may view the column of social security numbers, and in which User C information 328 labels User C as a marketing employee, User C information 328 may be used as input to viewing rules 330, sharing rules 332, or filtering rules 334 if an accounting employee tries to share a spreadsheet containing the column of social security numbers with User C. In some embodiments, the one or more references to a given user within user information 322 may be used to generate a version of a given spreadsheet that includes portions of the data in the spreadsheet that reference the given user.

In some embodiments, viewing rules 330, sharing rules 332, or filtering rules 334 may comprise user-defined rules or definitions for the spreadsheet editor. For example, a given user of the spreadsheet editor may define, via viewing rules 330, that only employees within the accounting department may view data pertaining to social security numbers. In such embodiments, data pertaining to social security numbers would be filtered from view before a version of the spreadsheet comprising at least the social security numbers is generated for a user who is not in the accounting department. In second example in which user information 322 comprises email addresses of each user, a given user of the spreadsheet editor may define, via sharing rules 332, that a given spreadsheet may not be shared with any user who does not have a company email address (e.g. johndoe@company.com). In such embodiments, upon receiving a request to share the given spreadsheet with a user of the spreadsheet editor that does not have the specified company email address (e.g. marybeth@enterprise.com), the spreadsheet is not shared. In a third example, a given user of the spreadsheet editor may define, via filtering rules 334, that employee names are filtered from view when a given spreadsheet is shared with a user who is not employed by the company. It should be understood by the reader that combinations of such rules, additional rules, or no user-defined rules may be placed in viewing rules 330, sharing rules 332, and 334, and that these examples are meant to be embodiments of features and options that are customizable to each set of users of the spreadsheet editor.

In addition, user-generated data 320 may comprise (or be linked to) one or more spreadsheet definitions for a given user. For example, a spreadsheet definition associated with User A may be stored as part of User A information 324 which may be referenced when User A either creates a spreadsheet or requests to share a spreadsheet with another user via one or more criteria received at the interface. For example, a spreadsheet definition may be a natural language query (or the one or more queries determined from the natural language query) used to create the spreadsheet.

User-generated data 120 and user-generated data 220 may similarly comprise such elements as those shown in FIG. 3, according to some embodiments. It should be understood by the reader that FIG. 3 represents some embodiments of user-generated data 320. However, other embodiments specific to the given user set for a spreadsheet editor may also apply and are meant to be encompassed in the disclosure herein. Additionally, filtering may refer to redacting, removing, or otherwise altering the spreadsheet for view by the respective user.

Figure 4:
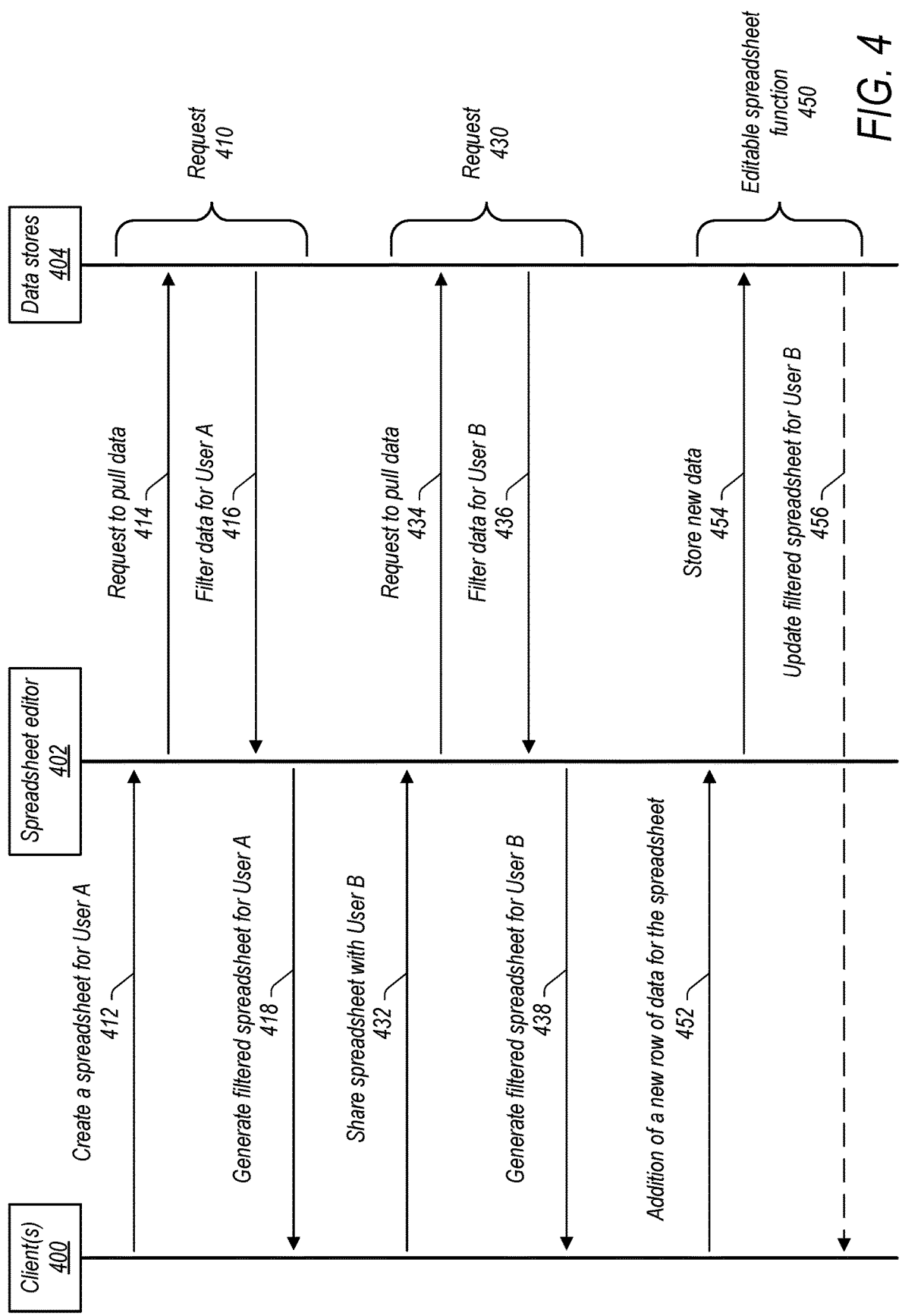
FIG. 4 is a sequence diagram illustrating three possible scenarios that a client of a spreadsheet editor could request of a spreadsheet editor service, according to some embodiments.

FIG. 4 is a sequence diagram illustrating three possible scenarios that a client of a spreadsheet editor could request of a spreadsheet editor service, according to some embodiments.

FIG. 4 comprises Request 410, Request 430, and Editable spreadsheet function 450, which exemplify example embodiments of interactions between Client 400, Spreadsheet editor 402, and Data stores 404. In some embodiments, Client 400 may resemble clients 570 of provider network 500, which will be discussed in more detail below. In some embodiments, Spreadsheet editor 402 may resemble spreadsheet editor service 510 within provider network 500. It should be understood by the reader that clients 570 of spreadsheet editor service 510 within provider network 500 (see description for FIG. 5 herein) and users of a spreadsheet editor (see description for FIGS. 6A-9 herein) may be used interchangeably. For example, in the embodiments shown in FIG. 4, User A and User B may be considered as clients of Client(s) 400. In another example, a client of Client(s) 400 may refer to a company comprising multiple users of a spreadsheet editor service that together may be considered as one client of Client(s) 400. Furthermore, in some embodiments, Data stores 404 may resemble data stores 140 and data stores 240 (see description for FIGS. 1-2 herein), and may also resemble data storage service(s) 540 (see description for FIG. 5 herein).

In Request 410, a client of Client(s) 400 submits a request to create a spreadsheet for User A via 412 to Spreadsheet editor 402. In some embodiments, request 412 may comprise one or more criteria specified via the interface, such as a natural language query. In other embodiments, however, a source spreadsheet with one or more filtering definitions may be already provided to the spreadsheet editor. As described above, User A may themselves be a client of Client(s) 400, or User A's company may submit request 412 on behalf of User A as a client of Client(s) 400. Once Spreadsheet editor 402 receives request 412, Spreadsheet editor 402 sends a request to Data stores 404 to pull data via 414. Data stores 404 then retrieves the data pertaining to the natural language query from one or more data storage locations (see descriptions for FIGS. 1-2 and 3 herein). Spreadsheet editor 402 may request to filter the data via 416 based on the user (client) that will be receiving and/or viewing the data. This filtering via 416 may comprise filtering via user-specific data (see descriptions for user-generated data 120, 220, and 320 in FIGS. 1-3 herein). Finally, the client of Client(s) 400 may receive the filtered spreadsheet via 418, according to some embodiments. The client of Client(s) 400 may view the generated spreadsheet via an interface of the spreadsheet editor 402, which is discussed in detail in descriptions for FIGS. 1-2 and 5-9 herein.

In Request 430, a first client, such as User A of a spreadsheet editor service, may request to share a given spreadsheet with a second client, such as User B of the spreadsheet editor service via 432. Once Spreadsheet editor 402 receives the request to share the given spreadsheet with a second client, Spreadsheet editor 402 sends a request to Data stores 404 to pull data via 434. Data pull 434 may comprise pulling data pertaining to the given spreadsheet, according to some embodiments. Data stores 404 then retrieves the data pertaining to the request from one or more data storage locations (see descriptions for FIGS. 1-2 and 3 herein). Spreadsheet editor 402 then requests to filter the data via 436 based on the user (client) that will be receiving and/or viewing the data. This filtering via 436 may comprise filtering via user-specific data (see descriptions for user-generated data 120, 220, and 320 in FIGS. 1-3 herein). Furthermore, in some embodiments, such as those described in blocks 808 and 910 below, the filtering via 436 may occur according to respective references to the user (client) who will be receiving and/or viewing the data. In embodiments shown by Request 430, said references refer to User B. Finally, the client of Client(s) 400 (User B) may receive the filtered spreadsheet via 438, according to some embodiments. The client of Client(s) 400 may view the generated spreadsheet via an interface of the spreadsheet editor 402, which is discussed in detail in descriptions for FIGS. 1-2 and 5-9 herein.

In Editable spreadsheet function 450, a client of Client(s) 400 may request to add a new row of data in a given spreadsheet via 452. In some embodiments, the client may interact with the spreadsheet editor via an interface, and make the request to add a new row via the interface, as shown in the embodiments of FIGS. 7A-7D below. In response to a client of Client(s) 400 inputting one or more new portions of data into a given spreadsheet, Spreadsheet editor 402 requests, via 454, that the new data be stored in data storage by Data stores 404. In some embodiments, a filtered version of the spreadsheet for one or more other users of the spreadsheet may be updated via 456 based on the addition of the new row via 452. For example, if User A completes Request 430 to share the spreadsheet with User B, and then User A completes Editable spreadsheet function 450, the filtered version of the spreadsheet for User B in 438 will be updated via 456. It should be understood by the reader that Editable spreadsheet function 450 is meant to be an exemplary editable spreadsheet function, and that other embodiments of Editable spreadsheet function 450 may comprise deleting a row of data in a given spreadsheet, editing data in an already-existing row in a given spreadsheet, or otherwise editing the tabular format(s) of a given spreadsheet.

Figure 5:
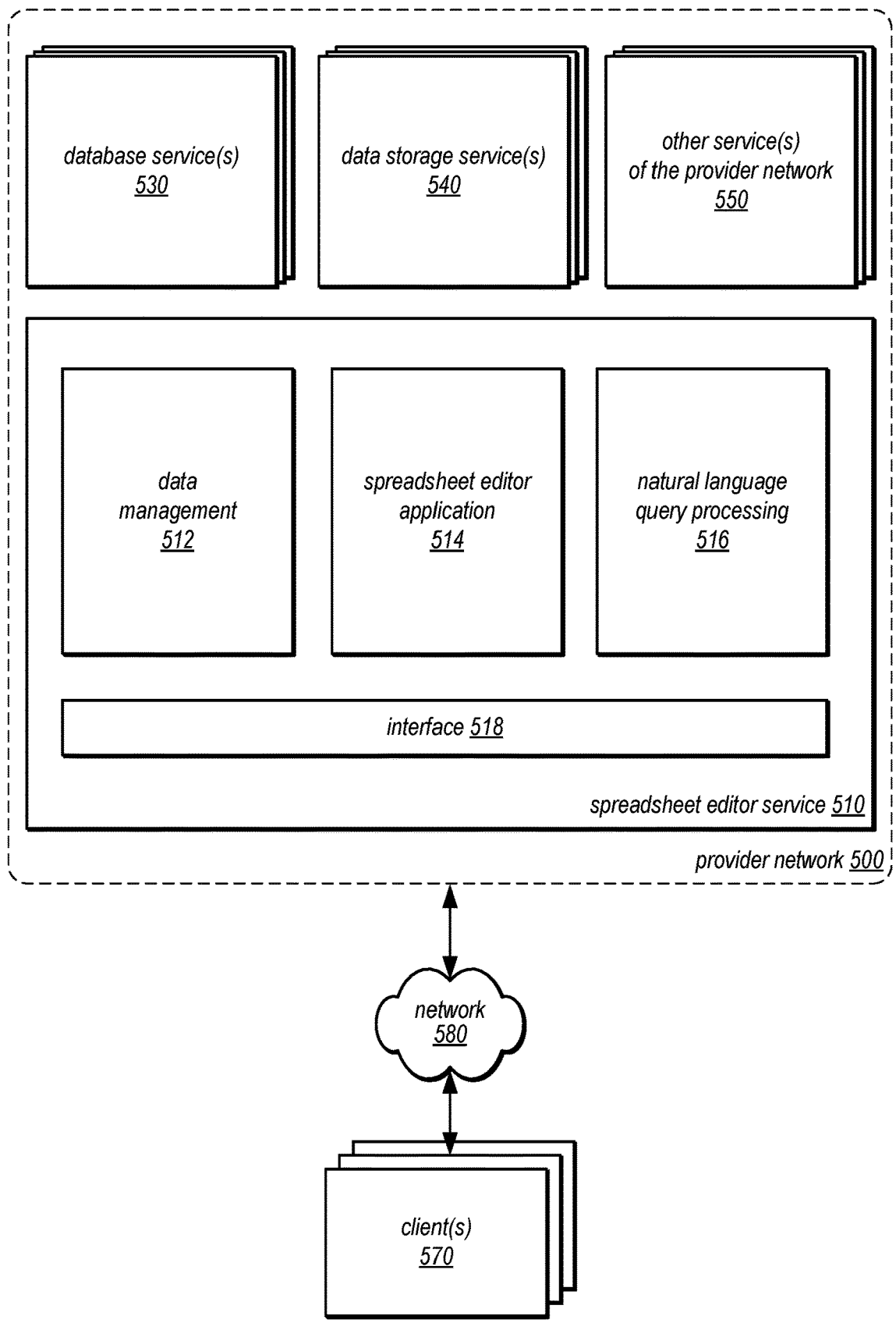
FIG. 5 is a logical block diagram illustrating a provider network offering a spreadsheet editor service that implements natural language query processing, including various data storage and processing services, according to some embodiments.

FIG. 5 is a logical block diagram illustrating a provider network offering a spreadsheet editor service that implements natural language query processing, including various data storage and processing services, according to some embodiments.

FIG. 5 is a logical block diagram illustrating a provider network offering a spreadsheet editor service that implements natural language query processing, including various data storage and processing services, according to some embodiments. Provider network 500 may be a private or closed system or may be set up by an entity such as a company or a public sector organization to provide one or more services (such as various types of cloud-based storage) accessible via the Internet and/or other networks to clients 570, in some embodiments. Provider network 500 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 500. In some embodiments, provider network 500 may implement various computing systems, platforms, resources, or services, such as a spreadsheet editor service 510, compute services, database service(s) 530, (e.g., relational or non-relational (NoSQL) database query engines, map reduce processing, data flow processing, and/or other large scale data processing techniques), data storage service(s) 540, (e.g., an object storage service, block-based storage service, or data storage service that may store different types of data for centralized access), data stream and/or event services, and other services (any other type of network based services (which may include various other types of storage, processing, analysis, communication, event handling, visualization charting, and security services not illustrated), including other service(s) of the provider network 550 that may provide additional functionalities for spreadsheet editor service 510.

In various embodiments, the components illustrated in FIG. 5 may be implemented directly within computer hardware, as instructions directly or indirectly executable by computer hardware (e.g., a microprocessor or computer system), or using a combination of these techniques. For example, the components of FIG. 5 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service(s) 540) may be implemented by a particular node or may be distributed across several nodes. In some embodiments, a given node may implement the functionality of more than one service system component (e.g., more than one data store component).

In various embodiments, spreadsheet editor service 510 may provide a scalable, serverless, and machine-learning powered service to create visualizations and analysis for data (e.g., dashboards, charting, etc.) to include in various applications (e.g., websites) accessing various data stores, such as data stored in database service(s) 530, data storage service(s) 540, or other service(s) of the provider network 550. Spreadsheet editor service 510 may implement interface 518, which may be implemented as various types of programmatic (e.g., Application Programming Interfaces (APIs)), command line, and/or graphical user interfaces to support the management of data sets for analysis, request, configure, and/or otherwise obtain new or existing analysis, and/or perform natural language queries, as discussed below.

Spreadsheet editor service 510 may implement data management 512, in various embodiments. Data management 512 may allow users to upload, identify, describe, augment, annotate, or otherwise prepare data sets for access, analysis, and/or visualization by spreadsheet editor service 510. For example, various requests to describe data, such as provide descriptions of columns, field values, or other information, which may be used enhance information that may be found in a data storage system (e.g., data in addition to a database schema or other table description). As discussed above with regard to FIGS. 1-3, such data management may be used as part of natural language query processing in some embodiments (e.g., as inputs to machine learning models). Data management 512 may additionally manage functions related to requests of users of spreadsheet editor service 510. For example, if a first user requests to share a spreadsheet with a second user of spreadsheet editor survive 510, data management 512 may create a copy of the spreadsheet and store it in one or more data stores via data storage service(s) 540. In a second example, if a user adds a new row of data to a spreadsheet via interface 518 (see also the description for FIGS. 7A-7D), data management 512 may group or organize the data for storage in one or more data stores via data storage service(s) 540.

Spreadsheet editor service 510 may implement spreadsheet editor application 514, which may perform the various operations to access data, analyze data, and/or generate a corresponding spreadsheet. For example, spreadsheet editor application 514 may understand and generate corresponding requests to obtain data from different database service(s) 530, data storage service(s) 540, or other service(s) of the provider network 550 according to the corresponding interfaces supported by those services (e.g., query language, API, protocols, etc.). Spreadsheet editor application 514 may be able to perform various data processing operations to determine and generate requested results (e.g., applying various aggregation, statistical analyses, or other operations), and also perform various data processing operations for natural language queries, in some embodiments. In some embodiments, spreadsheet editor application 514 may resemble the implementations discussed below with regard to FIGS. 4 and 6A-9.

Spreadsheet editor service 510 may implement natural language query processing 516, as discussed in detail below with regard to FIGS. 4 and 6A-7D, in order to handle responses to natural language queries to perform analysis, visualization, and organization using spreadsheet editor service 510, in some embodiments. For example, different data sets may be created, identified, or managed for access by natural language query processing 516. Natural language query processing 516 may implement multiple processing stages for executing one or more natural language queries, according to some embodiments. For example, a first processing stage may involve determining or otherwise recognizing one or more entities within a natural language query as data stored in one or more data stores as well as mappings, matches, or other links to the data stored in the one or more data stores to respective columns of a given spreadsheet. In some embodiments, a machine learning model (e.g., a Deep Neural Network(DNN)) that has been trained to recognize the entities (e.g., databases, database columns, or other stored data) from a natural language text string may be implemented. Given a natural language query, such as "Show me monthly sales per product for the last 3 months," the machine learning model can be applied to identify entities and entity types in the query: monthly, sales, product, months, and 3. These entities can then be matched with schema information stored for the various data stores (e.g., database table schemas) which can then be used to determine which data stores to query. In some embodiments, intent machine learning models (e.g., another DNN) may be trained to determine the various predicates or other features of a natural language query (e.g., "last 3 months") and translate the recognized entities and intent of the natural language query into a query language (e.g., SQL).

Natural language query processing 516 may then retrieve, via data storage service(s) 540, an initial selection of data in a second processing stage based on information gathered in the first processing stage. The second processing stage may also involve consulting metadata, such as user-generated data 320, in order to prepare the result of a given natural language query. A third processing stage may comprise providing the result(s) of the natural language query to the user via interface 518.

In various embodiments, database service(s) 530 may be various types of data processing services that perform general or specialized data processing functions (e.g., analytics, big data querying, time-series data, graph data, document data, relational data, structured data, or any other type of data processing operation) over data that is stored across multiple storage locations, in some embodiments. For example, in at least some embodiments, spreadsheet editor service 510 may include various types of database services (e.g., relational) for storing, querying, and updating data. Such services may be enterprise-class database systems that are scalable and extensible. Queries may be directed to a database in database service(s) 530 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, other service(s) of the provider network 550 may be various types of data processing services to perform different functions (e.g., query or other processing engines to perform functions such as anomaly detection, machine learning, data lookup, or any other type of data processing operation). For example, in at least some embodiments, other service(s) of the provider network 550 may include a map reduce service that creates clusters of processing nodes that implement map reduce functionality over data stored in one of data storage service(s) 540. Various other distributed processing architectures and techniques may be implemented by database service(s) 230 (e.g., grid computing, sharing, distributed hashing, etc.). Note that in some embodiments, data processing operations may be implemented as part of data storage service(s) 540 (e.g., query engines processing requests for specified data).

Data storage service(s) 540 may implement different types of data stores for storing, accessing, and managing data on behalf of clients 570 as a network-based service that enables clients 570 to operate a data storage system in a cloud or network computing environment. For example, one data storage service of data storage service(s) 540 may be implemented as a centralized data store so that other data storage services of data storage service(s) 540 may access data stored in the centralized data store for processing and or storing within the other data storage services, in some embodiments. Such an implementation of data storage service(s) 540 may be implemented as an object-based data store, and may provide storage and access to various kinds of object or file data stores for putting, updating, and getting various types, sizes, or collections of data objects or files. Such data storage service(s) 540 may be accessed via programmatic interfaces (e.g., APIs) or graphical user interfaces. Data storage service(s) 540 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services may provide resources to ingest, buffer, and process streaming data in real-time, which may be a source of data. In some embodiments, data stream and/or event services may act as an event bus or other communications/notifications for event driven systems or services (e.g., events that occur on provider network 500 services and/or on-premise systems or applications).

Generally speaking, clients 570 may encompass any type of client configurable to submit network-based requests to provider network 500 via network 580, including requests for spreadsheet editor service 510. For example, a given client of clients 570 may include a suitable version of a web browser, or may include a plug-in module or other type of code module that may execute as an extension to or within an execution environment provided by a web browser. Alternatively, a client 570 may encompass an application such as a database application (or user interface thereof), a media application, an office application or any other application that may make use of resources in provider network 500 to implement various features, systems, or applications (e.g., to store and/or access the data to implement various applications). In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 570 may interact directly with provider network 500. In some embodiments, client 570 may generate network-based services requests according to a Representational State Transfer (REST)-style network-based services architecture, a document- or message-based network-based services architecture, or another suitable network-based services architecture.

In some embodiments, a client of clients 570 may provide access to provider network 500 to other applications in a manner that is transparent to those applications. For example, a client of clients 570 may integrate with an operating system or file system to provide storage on one of data storage service(s) 540 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 540 may be coordinated by client 570 and the operating system or file system on behalf of applications executing within the operating system environment.

Clients 570 may convey network-based services requests (e.g., natural language queries) to and receive responses from provider network 500 via network 580. In various embodiments, network 580 may encompass any suitable combination of networking hardware and protocols necessary to establish network-based-based communications between clients 570 and provider network 500. For example, network 580 may generally encompass the various telecommunications networks and service providers that collectively implement the Internet. Network 580 may also include private networks such as local area networks (LANs) or wide area networks (WANs) as well as public or private wireless networks. For example, both a given client 570 and provider network 500 may be respectively provisioned within enterprises having their own internal networks. In such an embodiment, network 580 may include the hardware (e.g., modems, routers, switches, load balancers, proxy servers, etc.) and software (e.g., protocol stacks, accounting software, firewall/security software, etc.) necessary to establish a networking link between given client 570 and the Internet as well as between the Internet and provider network 500. It is noted that in some embodiments, clients 570 may communicate with provider network 500 using a private network rather than the public Internet.

Figure 6A:
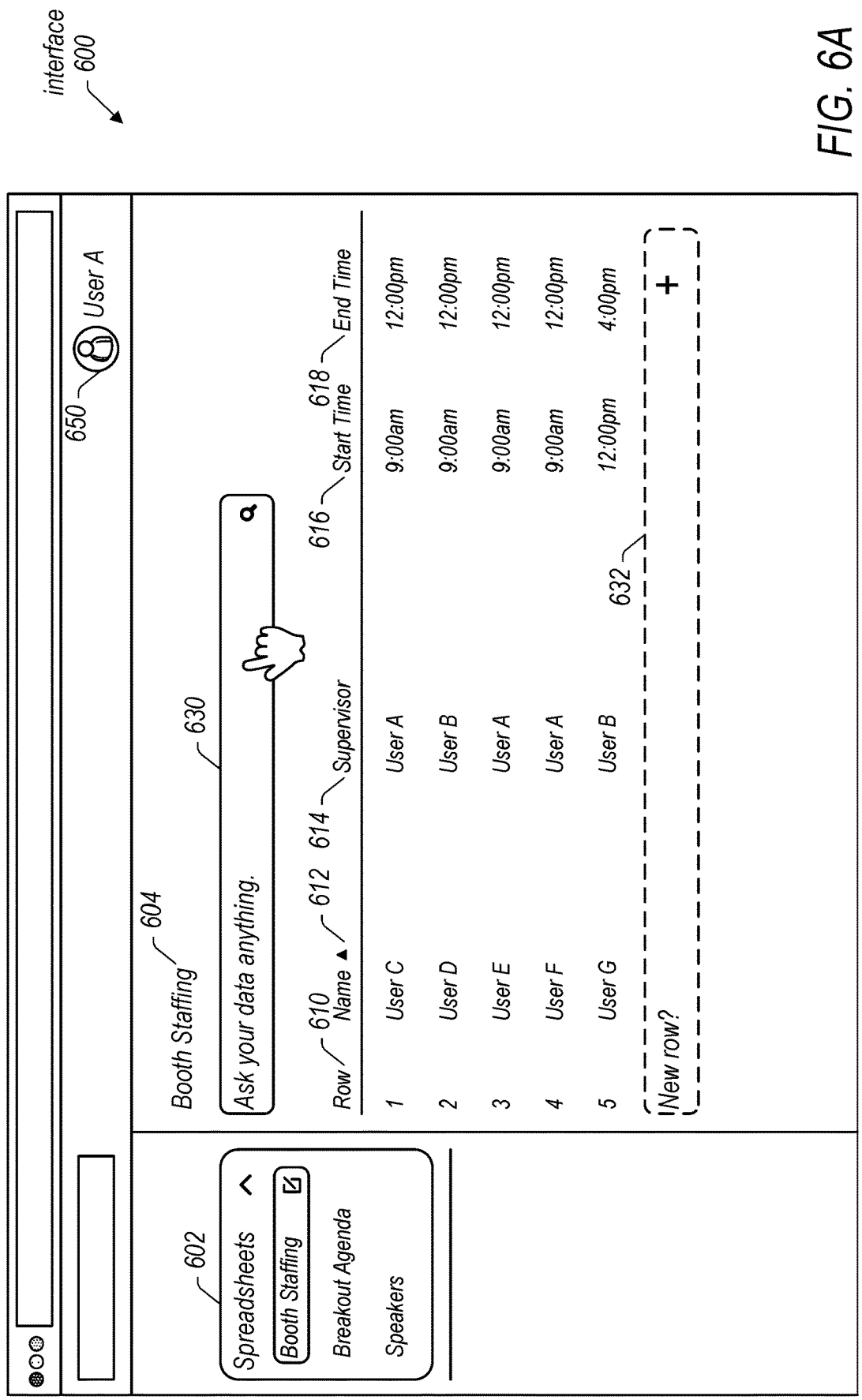
FIG. 6A is an example interface of a spreadsheet editor for User A illustrating a given spreadsheet with several editable spreadsheet functions and a natural language query prompt, according to some embodiments.

FIG. 6A is an example interface of a spreadsheet editor for User A illustrating a given spreadsheet with several editable spreadsheet functions and a natural language query prompt, according to some embodiments.

In FIG. 6A, interface 600 represents a given set of spreadsheets, e.g.

Spreadsheets 602, that may be viewed by User A. Spreadsheets 602 may comprise spreadsheets associated to User A, such as Booth Staffing, Breakout Agenda, and Speakers. Spreadsheets in Spreadsheets 602 may comprise data that are arranged or organized in tabular (e.g., data tables, such as large fact/dimension tables) formats with columns and rows, and/or multiple structural (e.g. structured, semi-structured, or unstructured) formats that may apply to different styles of categorical data. Spreadsheets in Spreadsheets 602 may comprise data of multiple datatypes (e.g. integers, floats, characters, strings, composite types, etc.) within a given spreadsheet.

In some embodiments, interface 600 is implemented as a graphical user interface. However, interface 600 may also be implemented as various types of programmatic (e.g., Application Programming Interfaces (APIs)) or command line interfaces to support the methods and systems described herein, according to some embodiments. In some embodiments, interface 600 may be implemented as a web-based graphical user interface, wherein a user profile may be loaded, such as User A profile 650, and User A subsequently may view Spreadsheets 602.

In the example shown in FIG. 6A, the spreadsheet named Booth Staffing 604 may be selected from User A's Spreadsheets 602 for viewing and/or editing. Booth Staffing 604 may comprise data of the spreadsheet that is arranged in a tabular format, according to some embodiments. Such a tabular format may comprise columns, such as Row 610, Name 612, Supervisor 614, Start Time 616, and End Time 618, and rows, such as rows 1, 2, 3, 4, and 5 of Row 610. Spreadsheet Booth Staffing 604 may also comprise a natural language query prompt, such as natural language query prompt 630, and one or more functions that allow Booth Staffing 604 to be edited by User A, such as "New row?" 632. In some embodiments, functions such as "New row?" 632 are limited to use by the spreadsheet manager, or the user who has created the spreadsheet via one or more criteria specified via the interface of the spreadsheet editor. This may be advantageous for the methods and techniques described herein, as this prevents users who may have permission to view all or parts of Booth Staffing 604 from overwriting data of the spreadsheet. Functions such as "New row?" 632 will be further detailed in FIGS. 7A-7D.

In the example shown in FIG. 6A, User A may click on natural language query prompt 630, which, by default, prompts User A to "Ask your data anything," and begin to write a request to the spreadsheet editor service, according to some embodiments. FIG. 6B shows the response of the spreadsheet editor service to a request from User A via natural language query prompt 630 to "Show Booth Staffing by start time."

FIG. 6B is an example interface of a spreadsheet editor for User A illustrating a given spreadsheet and a natural language request from User A for organizing data of the spreadsheet, according to some embodiments.

In FIG. 6A, User A has written a natural language request pertaining to Booth Staffing 604 via natural language query prompt 630 requesting to "Show Booth Staffing by start time." In response to this request, FIG. 6B shows that interface 600 displays the data in spreadsheet Booth Staffing 604 organized by the column Start Time 616, instead of by Name 612, as was shown in FIG. 6A.

FIG. 6C is an example interface of a spreadsheet editor for User A illustrating a given spreadsheet and a natural language request from User A for sharing data of the spreadsheet with User B, according to some embodiments.

In FIG. 6C, User A writes a new request via natural language query prompt 630 to "Share Booth Staffing with User B." In some embodiments, User A may write this request via natural language query prompt 630, and the spreadsheet editor service, via interface 600, will recognize the component "Booth Staffing" as referring to one of User A's Spreadsheets 602, and recognize the component "User B" as referring to one of the users of the spreadsheet service.

Figure 6D:
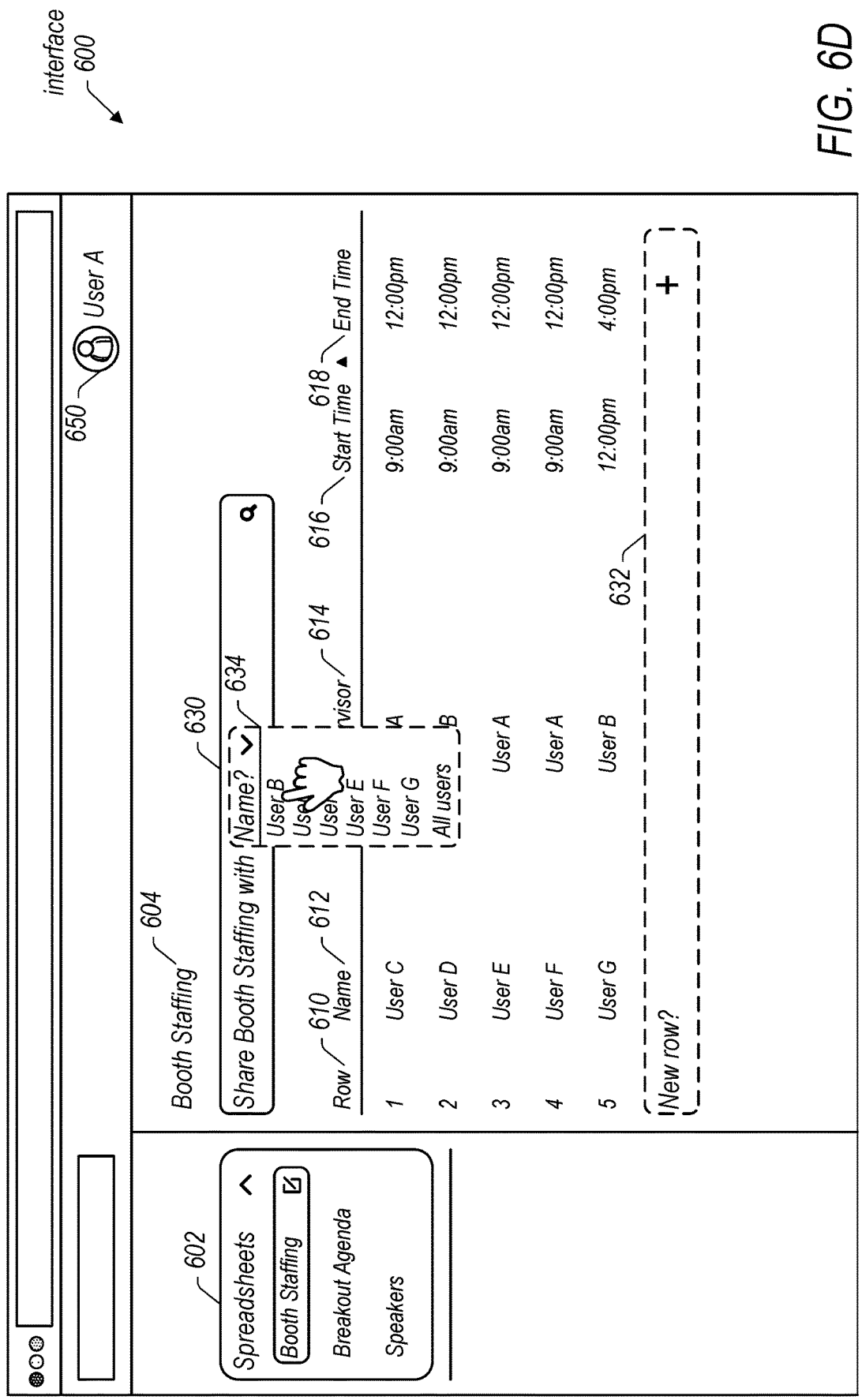
FIG. 6D is an example interface of a spreadsheet editor for User A illustrating a given spreadsheet and a natural language request from User A for sharing data of the spreadsheet with User B in which the interface of the spreadsheet editor provides options to autocomplete the natural language request from User A, according to some embodiments.

FIG. 6D is an example interface of a spreadsheet editor for User A illustrating a given spreadsheet and a natural language request from User A for sharing data of the spreadsheet with User B in which the interface of the spreadsheet editor provides options to autocomplete the natural language request from User A, according to some embodiments.

In addition to the embodiments shown in FIG. 6C, the natural language query prompt 630 may attempt to autocomplete the natural language request from User A, according to some embodiments. In the example shown in FIG. 6D, User A may begin to write "Share Booth Staffing with-" and interface 600 may recognize that User A intends to request that Booth Staffing 604 be shared with another user of the spreadsheet editor service, in which case interface 600 may provide User A with options to autocomplete the natural language request. In some such embodiments, interface 600 may provide a drop-down menu such as drop-down menu 634 in which User A may select the user that they would like to request that Booth Staffing 604 is shared with. Drop-down menu 634 may comprise exclusively the names of known users of the spreadsheet editor service. This may be advantageous for the methods and systems described herein, since there may be less ambiguity in the natural language request written into natural language query prompt 630 if User A is prompted to select from a pre-existing list of users of the spreadsheet editor service. In some embodiments, such a list of known users of the spreadsheet editor service may be pulled from user-generated data 120, user-generated data 220, or user-generated data 320 in FIG. 1, FIG. 2, or FIG. 3, respectively. In some embodiments, drop-down menu 634 may comprise an option for "All users." In such embodiments, "all users" may refer to users specified in user-generated data 120, user-generated data 220, or user-generated data 320, and one or more filtering rules (see descriptions for Viewing rules 330, Sharing rules 332, and Filtering rules 334 herein) may be applied based on the users referenced in "All users."

FIG. 6E is an example interface of a spreadsheet editor for User B illustrating a given spreadsheet that has been shared with them by request of User A, according to some embodiments.

In FIG. 6E, interface 600 represents a given set of spreadsheets, e.g. Spreadsheets 670, that may be viewed by User B. As described above for FIGS. 6A-6D, interface 600 may be implemented as a web-based graphical user interface, wherein a user profile may be loaded. For the example shown in FIG. 6E, User B profile 652 may be loaded, and User B subsequently may view spreadsheets listed in Spreadsheets 670. In the example shown in FIG. 6E, User A has sent User A's spreadsheet Booth Staffing 604 to User B, and now User B may view a version of Booth Staffing 604 called Booth Staffing 672. Similar to Booth Staffing 604, Booth Staffing 672 may comprise data of the spreadsheet that is arranged in a tabular format, according to some embodiments. Such a tabular format may comprise columns, such as Row 680, Name 682, Supervisor 684, Start Time 686, and End Time 688, and rows, such as rows 1 and 2 of Row 680. However, in the example shown in FIG. 6E, rows 3, 4, and 5 of Row 610, shown in FIGS. 6A-6D, have been removed from Booth Staffing 672 according to viewing permissions of User B. The reader may refer to the description above for user-generated data 120, user-generated data 220, and/or user-generated data 320 for more information on such filtering processes.

In some embodiments, User B may not be able to use functions that would allow Booth Staffing 672 to be edited by User B, such as "New row?" 632 shown in FIGS. 6A-6D, which is reserved for the user who has created the given spreadsheet, e.g. the spreadsheet manager User A in the examples shown in FIGS. 6A-6E. However, Booth Staffing 672 may still comprise a natural language query prompt, such as natural language query prompt 674 in which User B may write a request to the spreadsheet editor service.

Figure 7A:
FIG. 7A is another example interface of a spreadsheet editor for User A illustrating a given spreadsheet with several editable spreadsheet functions and a natural language query prompt, according to some embodiments.

FIG. 7A is another example interface of a spreadsheet editor for User A illustrating a given spreadsheet with several editable spreadsheet functions and a natural language query prompt, according to some embodiments.

In FIG. 7A, interface 700 represents a given set of spreadsheets, e.g. Spreadsheets 702, that may be viewed by User A. In some embodiments, interface 700 is implemented as a graphical user interface. However, interface 700 may also be implemented as various types of programmatic (e.g., Application Programming Interfaces (APIs)) or command line interfaces to support the methods and systems described herein, according to some embodiments. In some embodiments, interface 700 may be implemented as a web-based graphical user interface, wherein a user profile may be loaded, such as User A profile 750, and User A subsequently may view Spreadsheets 702.

In the embodiments shown in FIG. 7A, a spreadsheet named Booth Staffing 704 may be selected from User A's Spreadsheets 702 for viewing and/or editing. Booth Staffing 604 may comprise data of the spreadsheet that is arranged in a tabular format, according to some embodiments. Such a tabular format may comprise columns, such as Row 710, Name 712, Supervisor 714, Start Time 716, and End Time 718, and rows, such as rows 1, 2, 3, 4, and 5 of Row 710. Spreadsheet Booth Staffing 704 may also comprise a natural language query prompt, such as natural language query prompt 730, and one or more functions that allow Booth Staffing 704 to be edited by User A, such as "New row?" 732. In the example shown in FIG. 7A, User A may click on "New row?" 732 in order to write new data into Booth Staffing 704, according to some embodiments. This may also be considered as a new data entry.

Figure 7B:
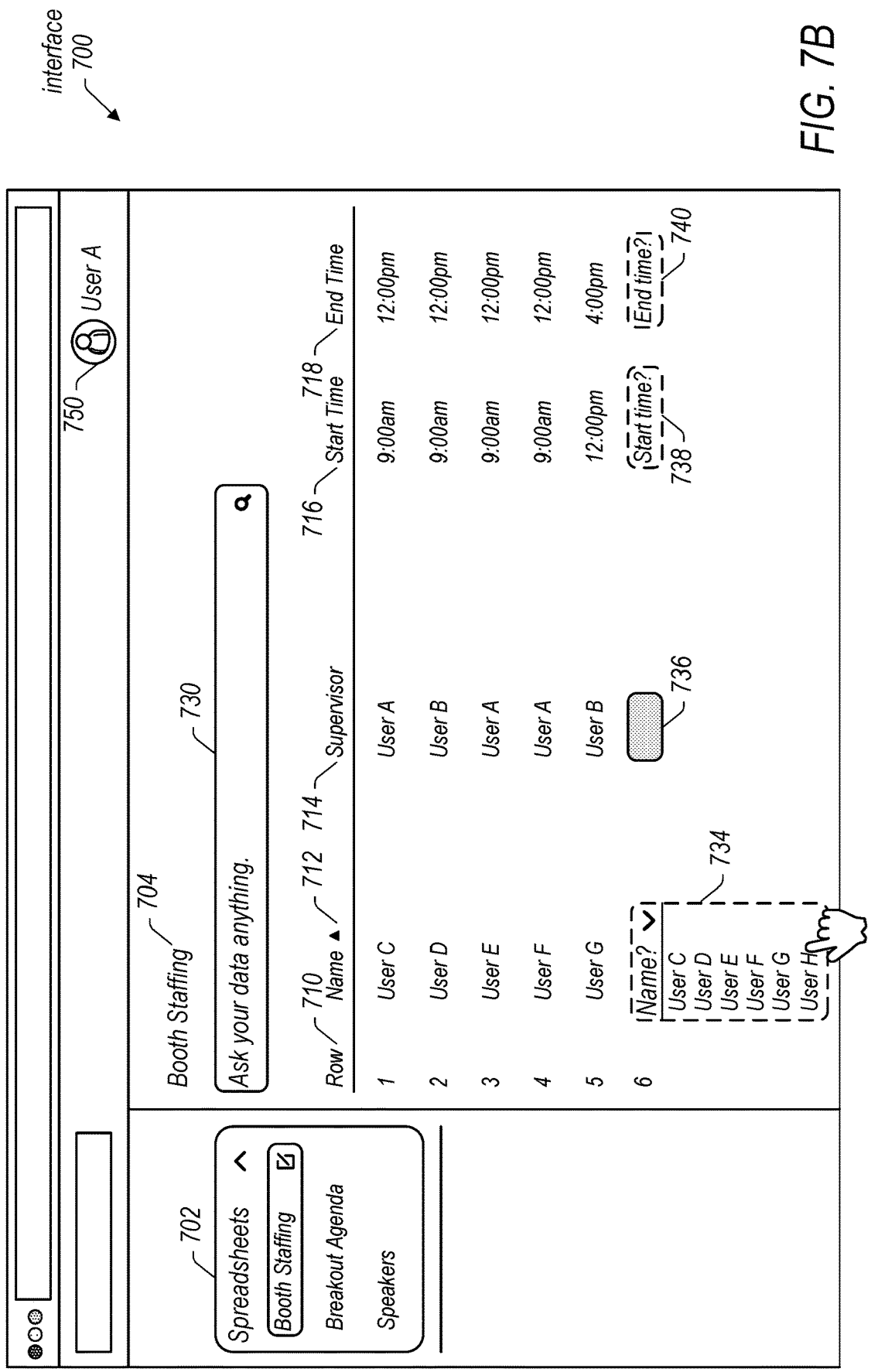
FIG. 7B is an example interface of a spreadsheet editor for User A illustrating an editable spreadsheet function of adding data to a new row of a given spreadsheet, in which User A is prompted to choose from a pre-existing list in order to complete the "Name" column, according to some embodiments.

FIG. 7B is an example interface of a spreadsheet editor for User A illustrating an editable spreadsheet function of adding data to a new row of a given spreadsheet, in which User A is prompted to choose from a pre-existing list in order to complete the "Name" column, according to some embodiments.

In FIG. 7B, User A begins to fill in data to row 6 of Row 710. In column Name 712, User A is prompted to choose the name of a user that this row 6 of Row 710 pertains to. In some embodiments, User A is prompted to select from a pre-existing list of users of the spreadsheet editor service. As shown in FIG. 7B, User A is prompted to select from a drop-down menu such as drop-down menu 734 which comprises a selection of users of the spreadsheet editor service. The reader may refer to the description above for user-generated data 120, user-generated data 220, and/or user-generated data 320 for more information on how the spreadsheet editor service may use user-specific data and/or metadata to create such lists. In the example shown in FIG. 7B, User A selects User H from drop-down menu 734. In some embodiments, User A may instead write the name of the user that they would like to add to row 6 of Row 710.

Figure 7C:
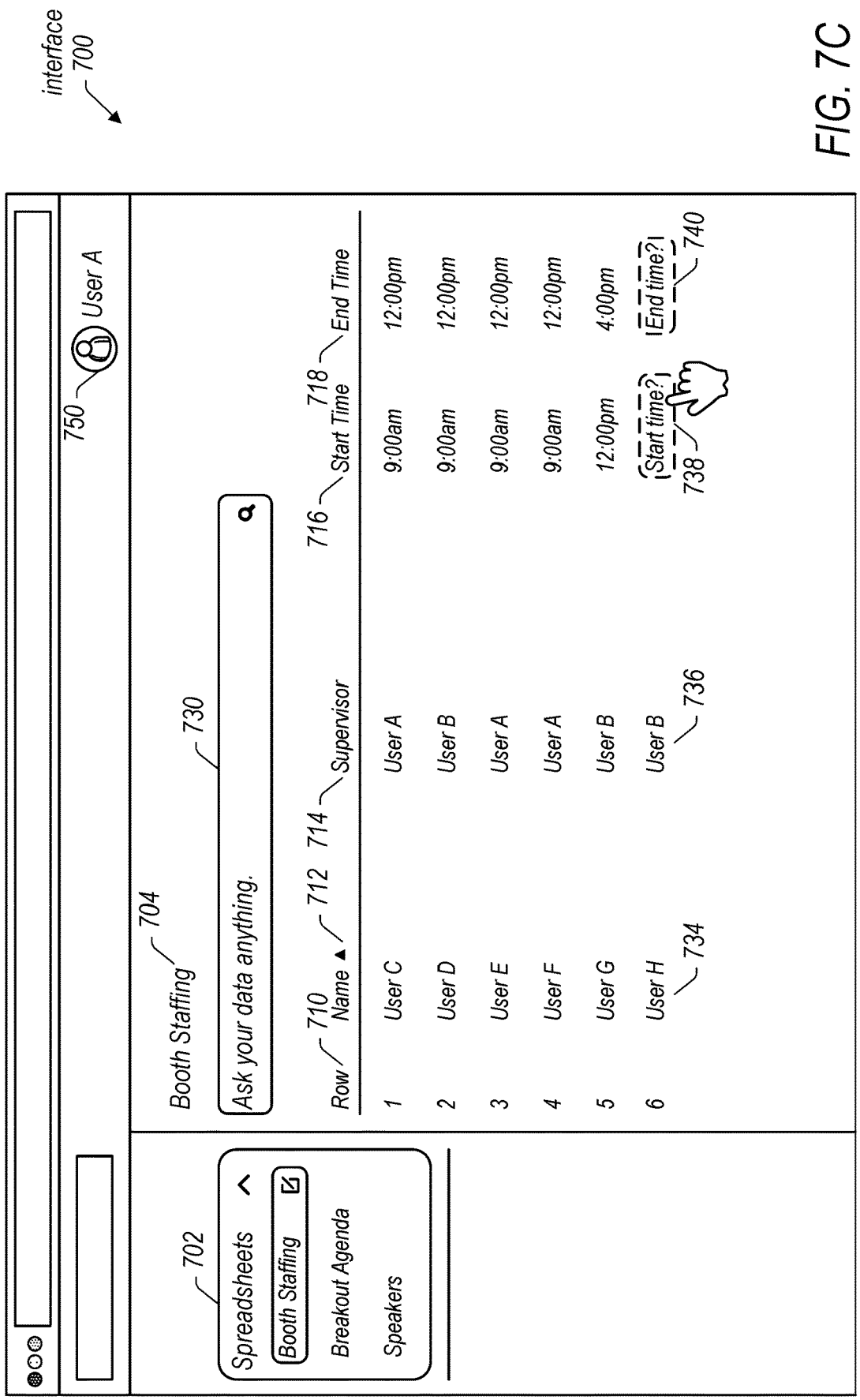
FIG. 7C is an example interface of a spreadsheet editor for User A illustrating an editable spreadsheet function of adding data to a new row of a given spreadsheet, in which the "Supervisor" column is autocompleted by the spreadsheet editor based on User A's selection for the "Name" column, as shown in FIG. 7B, according to some embodiments.

FIG. 7C is an example interface of a spreadsheet editor for User A illustrating an editable spreadsheet function of adding data to a new row of a given spreadsheet, in which the "Supervisor" column is autocompleted by the spreadsheet editor based on User A's selection for the "Name" column, as shown in FIG. 7B, according to some embodiments.

In FIG. 7C, in response to User A selecting User H to be filled in column Name 712 for row 6 of Row 710, data in row 6 of Row 710 is autocompleted for column Supervisor 714. User A may then click on the remaining columns for row 6 of Row 710 in order to complete the data entry.

Figure 7D:
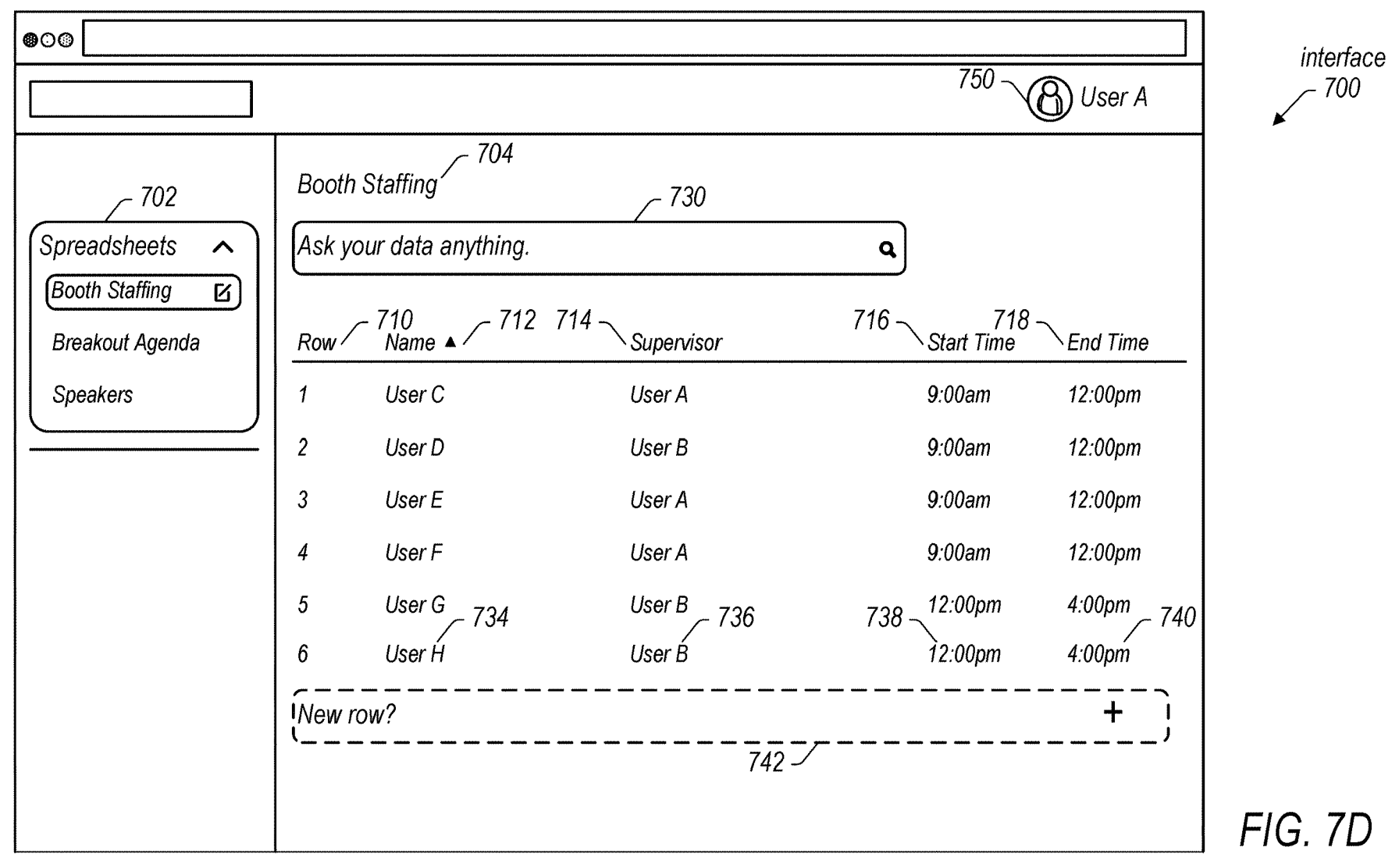

FIG. 7D is an example interface of a spreadsheet editor for User A illustrating an editable spreadsheet function of adding data to a new row of a given spreadsheet, in which the "Start Time" and "End Time" columns may be completed by User A, according to some embodiments.

In FIG. 7D, data entry for row 6 of Row 710 is complete, and User A may choose to complete another data entry via clicking on "New row?" 742, or choose to complete the one or more other functions that allow Booth Staffing 704 to be edited by User A. In some embodiments, FIGS. 7A-7D may resemble Editable spreadsheet function 450 shown in FIG. 4.

Figure 8:
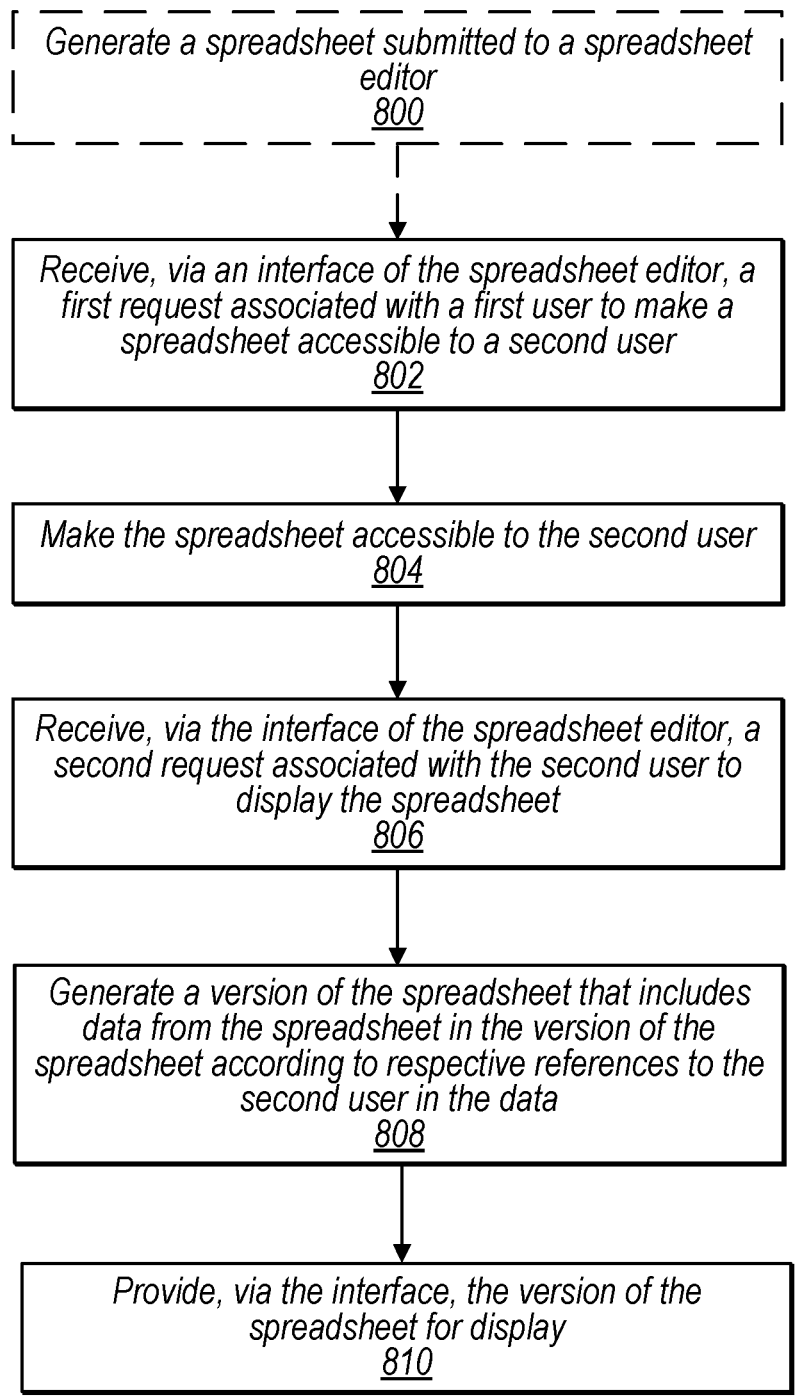
FIG. 8 is a high-level flowchart illustrating various methods and techniques to implement sharing, via a request from a first user of a spreadsheet editor, a given spreadsheet with a second user, according to some embodiments.

FIG. 8 is a high-level flowchart illustrating various methods and techniques to implement sharing, via a request from a first user of a spreadsheet editor, a given spreadsheet with a second user, according to some embodiments.

In some embodiments, the methods and techniques described herein may be implemented via the processes shown in FIG. 8. In block 800, a spreadsheet may be generated via one or more criteria specified via an interface of the spreadsheet editor to the spreadsheet editor. In some embodiments, the one or more criteria comprises a natural language query submitted to the spreadsheet editor. In some embodiments, the natural language query may be submitted via the interface by a user of the spreadsheet editor, such as via natural language query prompt 630 or natural language query prompt 730. In some embodiments, block 800 may correspond to create a spreadsheet for User A 412, in FIG. 4.

It should be understood by the reader that block 800 encompasses both the generation of a new spreadsheet and the generation of a spreadsheet derived from a pre-existing spreadsheet of the spreadsheet editor. For example, the spreadsheet that will be discussed below in blocks 802, 804, 806, 808, and 810 may have already been previously created or otherwise already exist within the spreadsheet editor. In some embodiments, a source spreadsheet may be provided. For example, in the embodiments shown in FIG. 6A-6E, User A may click on a given spreadsheet from Spreadsheets 602, such as Booth Staffing 604, and submit a natural language query pertaining to Booth Staffing 604 via natural language query prompt 630. Such a natural language query may resemble a variation of the natural language query shown in FIG. 6B, such as "Show Booth Staffing by start time and save the spreadsheet as Booth Staffing Schedule."

In some embodiments, upon subscription to a spreadsheet editor, a user of a spreadsheet editor may be prompted to use one or more templates and/or styles of spreadsheets proposed by the spreadsheet editor, and the user may then decide to use one of said pre-existing spreadsheet templates and edit the template accordingly. Such proposed templates may cater to the field of business that the users of the spreadsheet editor are in, and may comprise suggested templates such as "Event Planning," "Marketing Campaign Tracker," and "Product Launch." Proposed templates may also cater to the role (e.g. Sales, Marketing, Finance, Project Management, etc.) of a given spreadsheet manager or user of the spreadsheet editor. The proposed templates may represent broad business domains and various spreadsheet structures (e.g. structured, semi-structured, or unstructured set-ups) in order to encapsulate the breadth of options available in the spreadsheet editor to the user of the spreadsheet editor.

As denoted by the dashed line surrounding block 800, this step may be considered as optional, according to some embodiments. For example, for the embodiments shown in FIGS. 6A-6E, User A may skip the natural language request "Show Booth Staffing by start time," as shown in FIG. 6B, and directly request to "Share Booth Staffing with User B," as shown in FIG. 6C-6D. In block 802, a first request associated with a first user of the spreadsheet editor is received, via an interface of the spreadsheet editor, to make the spreadsheet accessible to a second user of the spreadsheet editor. Block 802 may resemble the methods and techniques described by Request 430 and/or natural language query prompt 630 shown in FIGS. 6C-6D. Block 802 may also comprise filtering the data in the given spreadsheet via user-generated data, such as user-generated data 120, user-generated data 220, and user-generated data 320. For example, for the embodiments shown in FIGS. 6C-6E, User A requests to share Booth Staffing 604 to User B, and, based at least in part on user-generated data for User B, such as user-generated data 120, user-generated data 220, and user-generated data 320, User B may access the version of the Booth Staffing 604 shown in FIG. 6E called Booth Staffing 672.

In some embodiments, the interface described in block 802 may resemble interface 600 and interface 700. The interface described in block 802 may be implemented as a web-based graphical user interface, wherein a user profile may be loaded, such as User A profile 650, User B profile 652, and User A profile 750, according to some embodiments. It should also be understood by the reader that the interface in block 802 may comprise user-specific interfaces, such as interface 110 which comprises at least interface for User A 112 and interface for User B 114.

In block 804, the spreadsheet is added to a set of available spreadsheets that are accessible to the second user via the spreadsheet editor. Then, in block 806, a second request associated with the second user of the spreadsheet editor is received, via the interface of the spreadsheet editor, to display the spreadsheet. In some embodiments, the second request in block 806 may be received with or without the second user's direct request to display the spreadsheet. For example, the second user may be otherwise notified that the first user has requested to share a spreadsheet with them, and, upon loading their user profile, blocks 804, 806, 808, and 810 are subsequentially completed via the spreadsheet editor.

In block 808, a version of the spreadsheet is generated that includes data from the spreadsheet in the version of the spreadsheet according to respective references to the second user in the data. Block 808 may resemble Filter data for User B 436 and Generate the spreadsheet for User B 438, as shown in Request 430 in FIG. 4, according to some embodiments. In some embodiments, the process of block 808 may comprise that certain portions of the given spreadsheet be removed, redacted, or filtered according to user-generated data for the second user in comparison to the entirety of the original spreadsheet as viewed by the spreadsheet manager. For example, for the embodiments shown in FIG. 6E, Booth Staffing 672 for User B comprises portions of Booth Staffing 604 for User A.

In block 810, the version of the spreadsheet is provided for display. Block 810 may resemble generated spreadsheet for User B 108, as shown in FIG. 1, according to some embodiments. In some embodiments in which the interface described in FIG. 8 is a graphical user interface, the version of the spreadsheet generated for the second user may resemble interface 600 shown in FIG. 6E.

Figure 9:
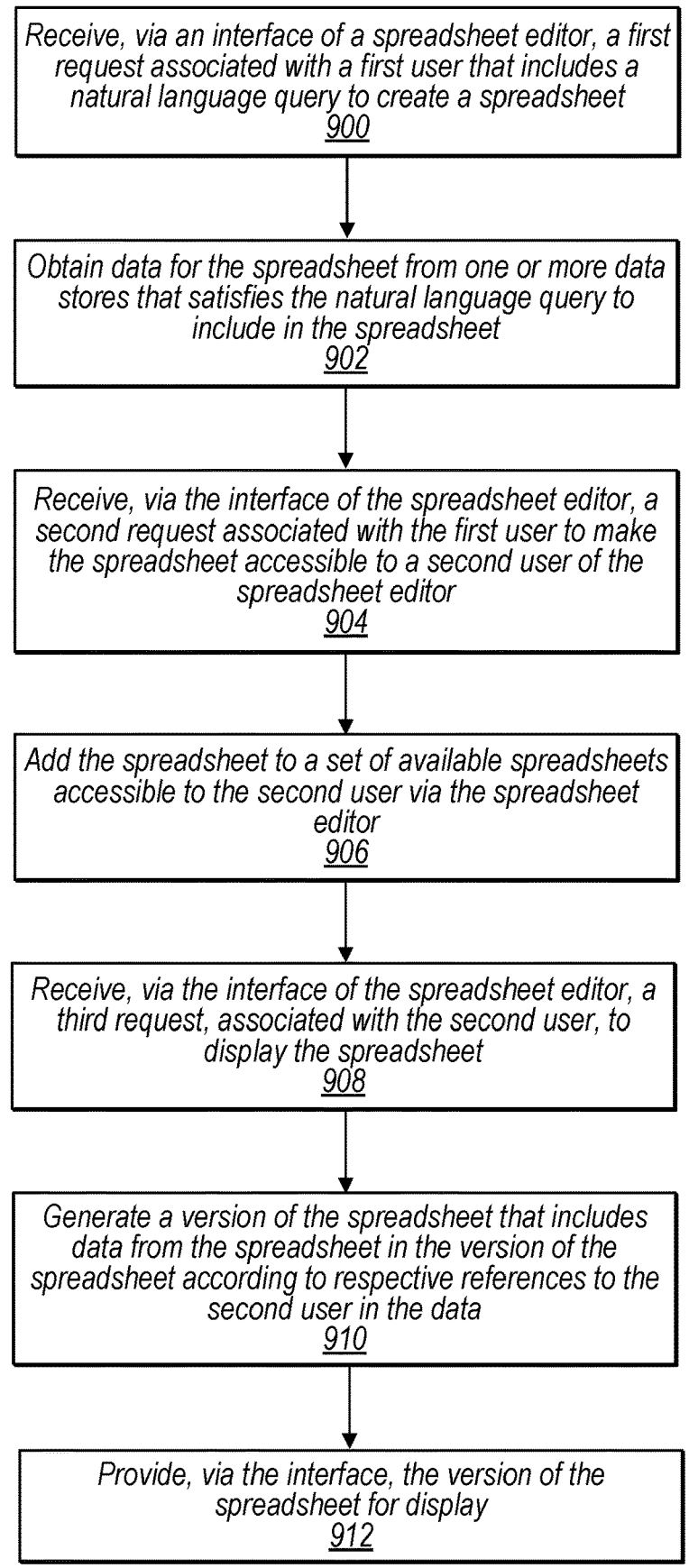
FIG. 9 is a high-level flowchart illustrating various methods and techniques to implement creation of a spreadsheet for a first user of a spreadsheet editor and sharing of said spreadsheet with a second user, according to some embodiments.

FIG. 9 is a high-level flowchart illustrating various methods and techniques to implement creation of a spreadsheet for a first user of a spreadsheet editor and sharing of said spreadsheet with a second user, according to some embodiments.

In some embodiments, the methods and techniques described herein may be implemented via the processes shown in FIG. 9. In block 900, a first request associated with a first user of a spreadsheet editor is received, via an interface of the spreadsheet editor, which includes a natural language query to create a spreadsheet. In some embodiments, block 900 may resemble embodiments described in block 800. It should be understood by the reader that block 900 encompasses both the generation of a new spreadsheet and the generation of a spreadsheet derived from a pre-existing spreadsheet of the spreadsheet editor, as described above.

In block 902, data to be included in the spreadsheet is obtained from one or more data stores that satisfies the natural language query associated with the first user. In some embodiments, the data stores in block 902 may resemble data stores 140, data stores 240 and data stores 404. In some embodiments, interactions between users, a spreadsheet editor, and data stores may be done at least in part via data storage services, such as data storage service(s) 540.

In block 904, a second request, associated with the first user, to make the spreadsheet accessible to a second user of the spreadsheet editor, is received via the interface of the spreadsheet editor. Block 904 may resemble the methods and techniques described by Request 430 and/or natural language query prompt 630 shown in FIGS. 6C-6D. Block 904 may also comprise filtering the data in the given spreadsheet via user-generated data, such as user-generated data 120, user-generated data 220, and user-generated data 320.

In block 906, the spreadsheet is added to a set of available spreadsheets that are accessible to the second user via the spreadsheet editor. Then, in block 908, a third request, associated with the second user, to display the spreadsheet is received via the interface of the spreadsheet editor. Next, in block 910, a version of the spreadsheet is generated that includes data from the spreadsheet in the version of the spreadsheet according to respective references to the second user in the data. In some embodiments, block 910 may resemble embodiments described in block 808. Furthermore, in some embodiments, blocks 906, 908, and 910 comprise adding the spreadsheet to a list of spreadsheets that reference a given user and displaying a version of the spreadsheet generated for the given user. For example, Spreadsheets 602 comprises spreadsheets that are made available to User A in FIGS. 6A-6D, while Spreadsheets 670 comprises spreadsheets that are made available to User B in FIG. 6E. In particular, Spreadsheets 670 comprises Booth Staffing 672 which has been shared via the methods and techniques described in FIG. 9, according to some embodiments.

In block 912, the version of the spreadsheet is provided for display. Block 912 may resemble generated spreadsheet for User B 108, as shown in FIG. 1, according to some embodiments. In some embodiments, block 912 may resemble embodiments described in block 810. In some embodiments in which the interface described in FIG. 9 is a graphical user interface, the version of the spreadsheet generated for the second user may resemble interface 600 shown in FIG. 6E.

Figure 10:
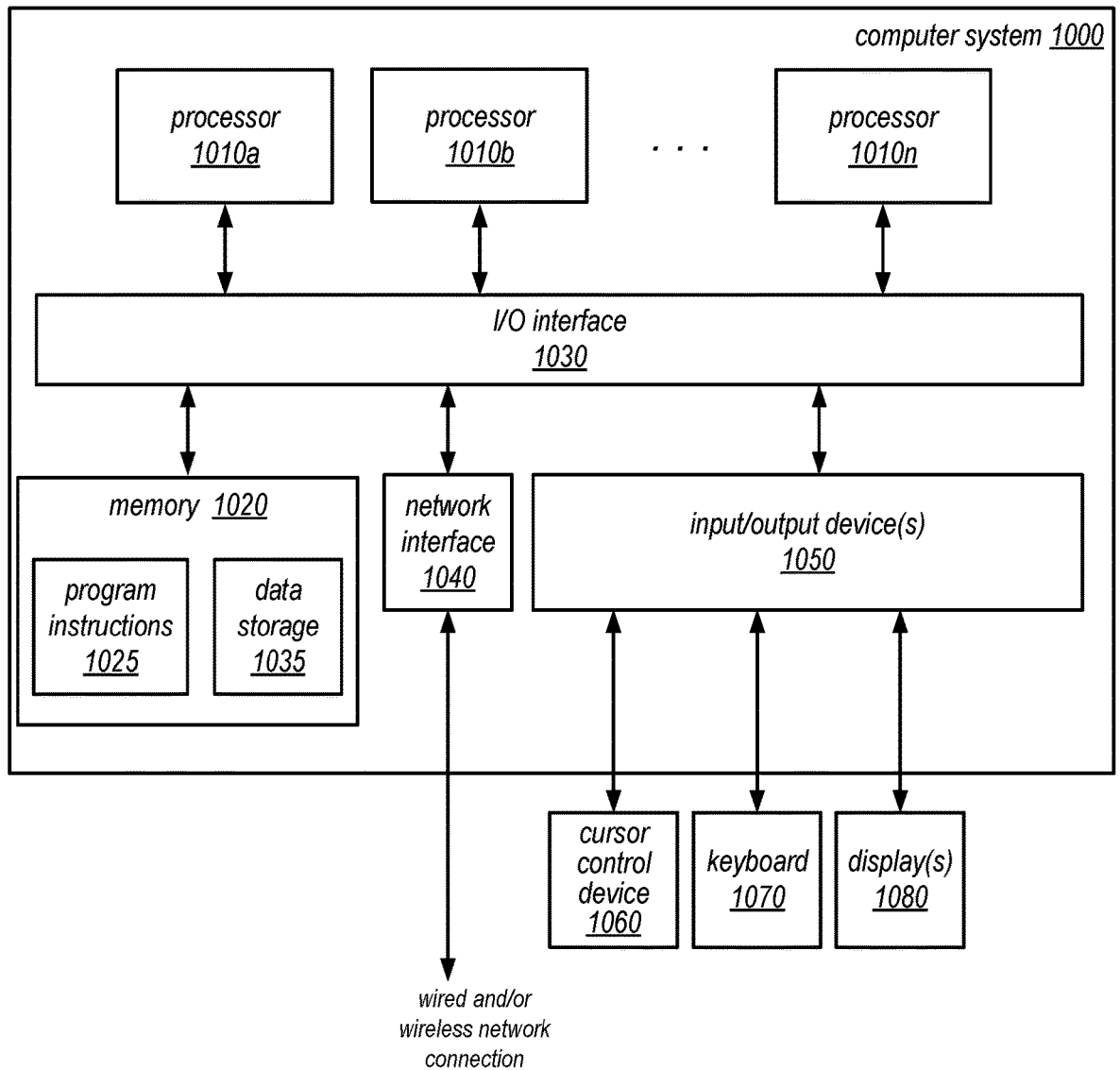
FIG. 10 illustrates an example system configured to implement the various methods, techniques, and systems described herein, according to some embodiments.

FIG. 10 illustrates an example system configured to implement the various methods, techniques, and systems described herein, according to some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of dynamically generating shared spreadsheets according to user references in spreadsheet data as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a spreadsheet editor, wherein the spreadsheet editor is configured to:
receive a first request to create a spreadsheet, wherein the first request is associated with a first user, received via an interface of the spreadsheet editor, and includes a natural language query to create a spreadsheet;
responsive to the first request, obtain data for the spreadsheet from one or more data stores that satisfies the natural language query to include in the spreadsheet; and
receive a second request to make the spreadsheet accessible to a second user of the spreadsheet editor, wherein the second request is associated with the first user and received via the interface of the spreadsheet editor;
responsive to the second request, add the spreadsheet to a set of available spreadsheets accessible to the second user via the spreadsheet editor;
receive a third request to display the spreadsheet, wherein the third request is received via the interface of the spreadsheet editor and associated with the second user;
responsive to the third request:
generate a version of the spreadsheet that includes those portions of the data with references to the second user in the version of the spreadsheet, wherein to generate the version of the spreadsheet, the spreadsheet editor is further configured to:
determine one or more portions of the data that are to be displayed to the second user, according to the references to the second user; and
filter out one or more other portions of the data based, at least in part, on a determination that the second user does not have appropriate permission to access the one or more other portions of the data; and
provide, via the interface, the version of the spreadsheet for display.

2. The system of claim 1, wherein the spreadsheet editor is implemented as part of a service offered by a provider network.

3. The system of claim 2, wherein the one or more data stores are implemented outside of the provider network.

4. The system of claim 1, wherein the second user is selected from a pre-existing list of users of the spreadsheet editor.

5. The system of claim 1, wherein the data obtained for the spreadsheet comprises two or more datatypes.

6. A method, comprising:
performing, by at least one processor executing program instructions stored in memory:
receiving a first request associated with a first user to make a spreadsheet accessible to a second user via an interface of a spreadsheet editor, wherein the spreadsheet was generated from one or more criteria, specified via the interface, that was previously submitted to the spreadsheet editor;
responsive to the first request, making, by the spreadsheet editor, the spreadsheet accessible to the second user;
receiving a second request associated with the second user to display the spreadsheet via the interface of the spreadsheet editor; and
responsive to the second request:
generating, by the spreadsheet editor, a version of the spreadsheet that includes data, from the spreadsheet, in the version of the spreadsheet according to respective references to the second user in the data, wherein said generating comprises:
determining one or more portions of the data that are to be displayed to the second user, according to the respective references to the second user; and
filtering out one or more other portions of the data based, at least in part, on determining that the second user does not have appropriate permission to access the one or more other portions of the data; and
providing, via the interface, the version of the spreadsheet for display.

7. The method of claim 6, wherein the second user is selected, via the interface, from a pre-existing list of users of the spreadsheet editor.

8. The method of claim 6, wherein generating the version of the spreadsheet according to respective references to the second user in the data is further based on user-generated data associated with the second user.

9. The method of claim 6, wherein the spreadsheet generated from the one or more criteria, specified via the interface, was specified via a natural language query.

10. The method of claim 9, further comprising creating the spreadsheet from respective results of one or more queries sent to one or more data stores determined from the natural language query.

11. The method of claim 6, wherein the method further comprises adding, via the interface, further data to the spreadsheet.

12. The method of claim 11, wherein, responsive to adding the further data of the spreadsheet, the version of the spreadsheet for display is updated.

13. The method of claim 6, wherein the method further comprises removing, via the interface, a portion of the data of the spreadsheet.

14. The method of claim 13, wherein, responsive to removing the portion of the data of the spreadsheet, the version of the spreadsheet for display is updated.

15. The method of claim 6, wherein making the spreadsheet accessible to the second user comprises adding the spreadsheet to a set of available spreadsheets accessible to the second user via the spreadsheet editor.

16. One or more non-transitory, computer-readable storage media, storing program instructions that when executed on or across one or more computing devices, cause the one or more computing devices to implement:
receiving a first request associated with a first user to make a spreadsheet accessible to a second user via an interface of a spreadsheet editor, wherein the spreadsheet was generated from data obtained from one or more data stores that satisfies one or more criteria, specified via the interface, that was previously submitted to the spreadsheet editor;
responsive to the first request, making the spreadsheet accessible to the second user;
receiving a second request associated with the second user to display the spreadsheet via the interface of the spreadsheet editor;
responsive to the second request:
generating, by the spreadsheet editor, a version of the spreadsheet that includes data, from the spreadsheet, in the version of the spreadsheet according to respective references to the second user in the data, wherein said generating comprises:

determining one or more portions of the data that are to be displayed to the second user, according to the respective references to the second user; and filtering out one or more other portions of the data based, at least in part, on determining that the second user does not have appropriate permission to access the one or more other portions of the data; and providing, via the interface, the version of the spreadsheet for display.

17. The one or more non-transitory, computer-readable storage media of claim 16, wherein the spreadsheet generated from the one or more criteria, specified via the interface, was specified via a natural language query.

18. The one or more non-transitory, computer-readable storage media of claim 16, wherein, in making the spreadsheet accessible to the second user, the program instructions cause the one or more computing devices to implement adding the spreadsheet to a set of available spreadsheets accessible to the second user via the spreadsheet editor.

19. The one or more non-transitory, computer-readable storage media of claim 16, wherein generating the version of the spreadsheet is further based on user-generated data associated with the second user.

20. The one or more non-transitory, computer-readable storage media of claim 19, storing further program instructions that when executed on or across the one or more computing devices, cause the one or more computing devices to further implement updating the version of the spreadsheet responsive to an update to the user-generated data associated with the second user.

* * * * *